US012097597B2

(12) United States Patent
Murakami et al.

(10) Patent No.: US 12,097,597 B2
(45) Date of Patent: Sep. 24, 2024

(54) IMPACT ROTARY TOOL, MANAGEMENT SYSTEM, AND IMPACT ROTARY TOOL SYSTEM

(71) Applicant: Panasonic Holdings Corporation, Osaka (JP)

(72) Inventors: Hiroaki Murakami, Mie (JP); Masanori Nakamoto, Mie (JP); Motoharu Muto, Mie (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 0 days.

(21) Appl. No.: 17/984,035

(22) Filed: Nov. 9, 2022

(65) Prior Publication Data

US 2023/0158647 A1 May 25, 2023

(30) Foreign Application Priority Data

Nov. 19, 2021 (JP) ................................ 2021-188795

(51) Int. Cl.
*B25B 23/147* (2006.01)
*B25B 21/02* (2006.01)

(52) U.S. Cl.
CPC .......... *B25B 23/1475* (2013.01); *B25B 21/02* (2013.01)

(58) Field of Classification Search
CPC .......... B25B 23/14–1475; B25B 23/15; B25B 21/008; B25B 21/02–026
See application file for complete search history.

(56) References Cited

U.S. PATENT DOCUMENTS 5,154,242 A * 10/1992 Soshin .................. B25B 23/147 173/180
5,353,882 A * 10/1994 Inoue .................... B25B 23/147 173/176

(Continued)

FOREIGN PATENT DOCUMENTS

| | | | |
|---|---|---|---|
| EP | 1 524 084 | A2 | 4/2005 |
| EP | 2 042 271 | A2 | 4/2009 |
| JP | 2018-122392 | A | 8/2018 |

OTHER PUBLICATIONS

Extended European Search Report dated Apr. 28, 2023 issued in the corresponding European Patent Application No. 22206576.5.

*Primary Examiner* — Dariush Seif
(74) *Attorney, Agent, or Firm* — Rimon P.C.

(57) ABSTRACT

An impact rotary tool includes a motor, an output shaft configured to hold a tip tool and configured to rotate by a motive power of the motor, an impact mechanism configured to perform an impact operation to repeatedly generate, from the motive power of the motor, impact force acting on the output shaft, and a seating detector configured to detect a seating of a fastener component which is a state where the fastener component rotated by the tip tool is just seated on a work target. The seating detector has a plurality of seating detection modes. The impact rotary tool further includes an acquirer configured to acquire information indicative of one seating detection mode selected from the plurality of seating detection modes. The seating detector is configured to detect the seating of the fastener component based on the one seating detection mode indicated by the information acquired by the acquirer.

8 Claims, 8 Drawing Sheets

(56) References Cited

U.S. PATENT DOCUMENTS 5,361,852 A * 11/1994 Inoue .................... B25B 23/14 173/176
6,144,891 A * 11/2000 Murakami ............. B23P 19/10 81/467
10,173,305 B2 * 1/2019 Matsuoka ............. B23P 19/107
10,183,384 B2 * 1/2019 Takano ............... B25B 23/1475
10,792,795 B2 * 10/2020 Lee ........................ B25B 23/14
2002/0060082 A1 * 5/2002 Watanabe ........... B25B 23/1405 173/176
2002/0134172 A1 * 9/2002 Yamada .............. B25B 23/1453 73/862.21
2003/0149508 A1 * 8/2003 Watanabe ........... B25B 23/1405 73/862.23
2004/0182588 A1 * 9/2004 Tokunaga ........... B25B 23/1453 173/176
2005/0109519 A1 * 5/2005 Kawai .................. B25B 21/026 173/183
2009/0014192 A1 * 1/2009 Ito ........................ B25B 23/1475 173/217
2009/0084568 A1 * 4/2009 Arimura ............. B25B 23/1475 173/104
2011/0079407 A1 * 4/2011 Iimura ................ B25B 23/1405 173/217
2012/0055690 A1 * 3/2012 Uemura .............. B25B 23/1453 173/177
2012/0168189 A1 * 7/2012 Eckert ..................... B25B 21/00 173/1
2012/0169256 A1 * 7/2012 Suda .................... B25D 16/003 318/17
2012/0234566 A1 * 9/2012 Mashiko ................. B25B 21/02 173/93.5
2013/0000938 A1 * 1/2013 Matsunaga ........... B25B 21/008 173/181
2013/0008679 A1 * 1/2013 Nishikawa .............. B25B 21/02 173/93
2013/0025892 A1 * 1/2013 Mashiko ............... B25B 21/026 173/2
2013/0133911 A1 * 5/2013 Ishikawa ............... B25B 21/026 173/176
2013/0153252 A1 * 6/2013 Sakakibara ......... B25B 23/1405 173/1
2013/0264087 A1 * 10/2013 Harada ................... B23B 45/00 173/213
2014/0262390 A1 * 9/2014 Arimura ................. B25B 21/02 173/7
2014/0374130 A1 * 12/2014 Nakamura ............ B25B 21/026 173/176
2015/0135907 A1 * 5/2015 Hirabayashi ........... B23Q 5/048 81/54
2015/0144365 A1 * 5/2015 Hirabayashi ........ B25B 23/1405 173/2
2015/0158157 A1 * 6/2015 Hirabayashi ........ B25B 23/0064 81/429
2015/0231770 A1 * 8/2015 Kusakawa .............. B25B 21/02 173/93.5
2016/0008961 A1 * 1/2016 Takano ..................... B25F 5/00 173/2
2016/0375563 A1 * 12/2016 Junkers ................... B25F 5/026 81/467
2017/0197302 A1 * 7/2017 Kobayashi ............ B25B 13/463
2017/0246732 A1 * 8/2017 Dey, IV .............. B25B 23/1475
2017/0348037 A1 * 12/2017 Sexson .............. A61B 17/1617
2018/0272511 A1 * 9/2018 Sako ................... B25B 23/1405
2018/0297179 A1 * 10/2018 Osada ................... B25B 21/008
2019/0030692 A1 * 1/2019 Harada ............... B25B 23/1475
2019/0227528 A1 * 7/2019 Abbott ................... G06N 20/00
2019/0294138 A1 * 9/2019 Dobashi .................... B25F 5/02
2019/0321949 A1 * 10/2019 Miyazaki .............. B23P 19/065
2019/0381648 A1 * 12/2019 Wadeson .............. B25B 21/002
2020/0023501 A1 * 1/2020 Bandy ................. B25B 23/1453
2021/0323125 A1 * 10/2021 Murui ................. B25B 23/1475
2021/0372442 A1 * 12/2021 Junkers ............... B25B 23/1415
2021/0394344 A1 * 12/2021 Mueckl ................. B25B 21/026
2022/0377256 A1 * 11/2022 Sasaki .................... H04N 23/80
2022/0379445 A1 * 12/2022 Nakahara ............ B25B 23/1475
2023/0148339 A1 * 5/2023 Fortoloczki ......... B25B 23/1425 81/469
2023/0177753 A1 * 6/2023 Sasaki ................. B25B 23/1475 345/619
2023/0271306 A1 * 8/2023 Nakamoto .............. B25B 21/02 173/176

* cited by examiner

IMPACT ROTARY TOOL, MANAGEMENT SYSTEM, AND IMPACT ROTARY TOOL SYSTEM

CROSS-REFERENCE TO RELATED APPLICATIONS

The present application is based upon and claims the benefit of priority to Japanese Patent Application No. 2021-188795, filed on Nov. 19, 2021, the entire contents of which are incorporated herein by reference.

TECHNICAL FIELD

The present disclosure relates generally to impact rotary tools, management systems, and impact rotary tool systems. More specifically, the present disclosure relates to an impact rotary tool that performs an impact operation to repeatedly generate, from a motive power of a motor, impact force acting an output shaft, a management system that manages an impact rotary tool, and an impact rotary tool system including a management system.

BACKGROUND ART

JP2018-122392A discloses an impact rotary tool. In a torque management mode, the impact rotary tool of JP2018-122392A determines a seating of a screw member by using a tightening torque value calculated by a torque estimation unit and performs shut-off control of automatically stopping a rotation of a motor by counting the number of impacts detected by an impact detection unit after the screw member is seated.

In this impact rotary tool, a seating determination level should be set, which is a parameter to define a torque value for determining the seating of the screw member. Therefore, a schedule controller sets the "seating determination level" for obtaining a target torque value in the rotary impact tool, before a work is started.

SUMMARY

Information about a seated time (seated time information) when a fastener component is just seated on a work target under a tightening work for tightening the fastener component may be useful for various purposes. In this regard, an appropriate time when the fastener component is determined to be seated may vary depending on an intended purpose which the seated time information is to be used for. The impact rotary tool described in JP2018-122392A is configured to determine that the fastener component is just seated when the tightening torque value reaches the seating determination level set in advance. This configuration cannot be changed, although the setting determination level is allowed to be changed. Therefore, a seated time determined by this impact rotary tool may possibility be different from a timing intended by a user of the impact rotary tool.

An object of the present disclosure is to provide an impact rotary tool, a management system, and an impact rotary tool system that can detect a seating at a timing approximated to a timing intended by a user.

An impact rotary tool according to an aspect of the present disclosure includes a motor, an output shaft, an impact mechanism, and a seating detector. The output shaft is configured to hold a tip tool and configured to rotate by a motive power of the motor. The impact mechanism is configured to perform an impact operation to repeatedly generate, from the motive power of the motor, impact force acting on the output shaft. The seating detector is configured to detect a seating of a fastener component which is a state where the fastener component rotated by the tip tool is just seated on a work target. The seating detector has a plurality of seating detection modes. The impact rotary tool further includes an acquirer configured to acquire information indicative of one seating detection mode selected from the plurality of seating detection modes. The seating detector is configured to detect the seating of the fastener component based on the one seating detection mode indicated by the information acquired by the acquirer.

A management system according to an aspect of the present disclosure is for managing an impact rotary tool. The impact rotary tool includes a motor, an output shaft, an impact mechanism, and a first communications unit. The output shaft is configured to hold a tip tool and configured to rotate by a motive power of the motor. The impact mechanism is configured to perform an impact operation to repeatedly generate, from the motive power of the motor, impact force acting on the output shaft. The first communications unit is configured to communicate with the management system. The management system includes a second communications unit and a seating detector. The second communications unit is configured to communicate with the first communications unit of the impact rotary tool. The seating detector is configured to detect, based on information acquired from the impact rotary tool through the second communications unit, a seating of a fastener component which is a state where the fastener component rotated by the tip tool held by the output shaft of the impact rotary tool is just seated on a work target. The seating detector has a plurality of seating detection modes. The management system further includes an acquirer configured to acquire information indicative of one seating detection mode selected from the plurality of seating detection modes. The seating detector is configured to detect the seating of the fastener component based on the one seating detection mode indicated by the information acquired by the acquirer.

An impact rotary tool system according to an aspect of the present disclosure includes an impact rotary tool and a management system. The impact rotary tool includes a motor, an output shaft, an impact mechanism, and a first communications unit. The output shaft is configured to hold a tip tool and configured to rotate by a motive power of the motor. The impact mechanism is configured to perform an impact operation to repeatedly generate, from the motive power of the motor, impact force acting on the output shaft. The first communications unit is configured to communicate with the management system. The management system includes a second communications unit and a seating detector. The second communications unit is configured to communicate with the first communications unit of the impact rotary tool. The seating detector is configured to detect, based on information acquired from the impact rotary tool through the second communications unit, a seating of a fastener component which is a state where the fastener component rotated by the tip tool held by the output shaft of the impact rotary tool is just seated on a work target. The seating detector has a plurality of seating detection modes. The management system further includes an acquirer configured to acquire information indicative of one seating detection mode selected from the plurality of seating detection modes. The seating detector is configured to detect the seating of the fastener component based on the one seating detection mode indicated by the information acquired by the acquirer.

BRIEF DESCRIPTION OF THE DRAWINGS

The figures depict one or more implementation in accordance with the present teaching, by way of example only, not by way of limitations. In the figures, like reference numerals refer to the same or similar elements, where.

DETAILED DESCRIPTION

An impact rotary tool and an impact rotary tool system including the impact rotary tool according to an embodiment of the present disclosure will be described with reference to the drawings. The drawings to be referred to in the following description of embodiments are all schematic representations. That is to say, the ratio of the dimensions (including thicknesses) of respective constituent elements illustrated on the drawings does not always reflect their actual dimensional ratio.

(1) Overview

Figure 1:
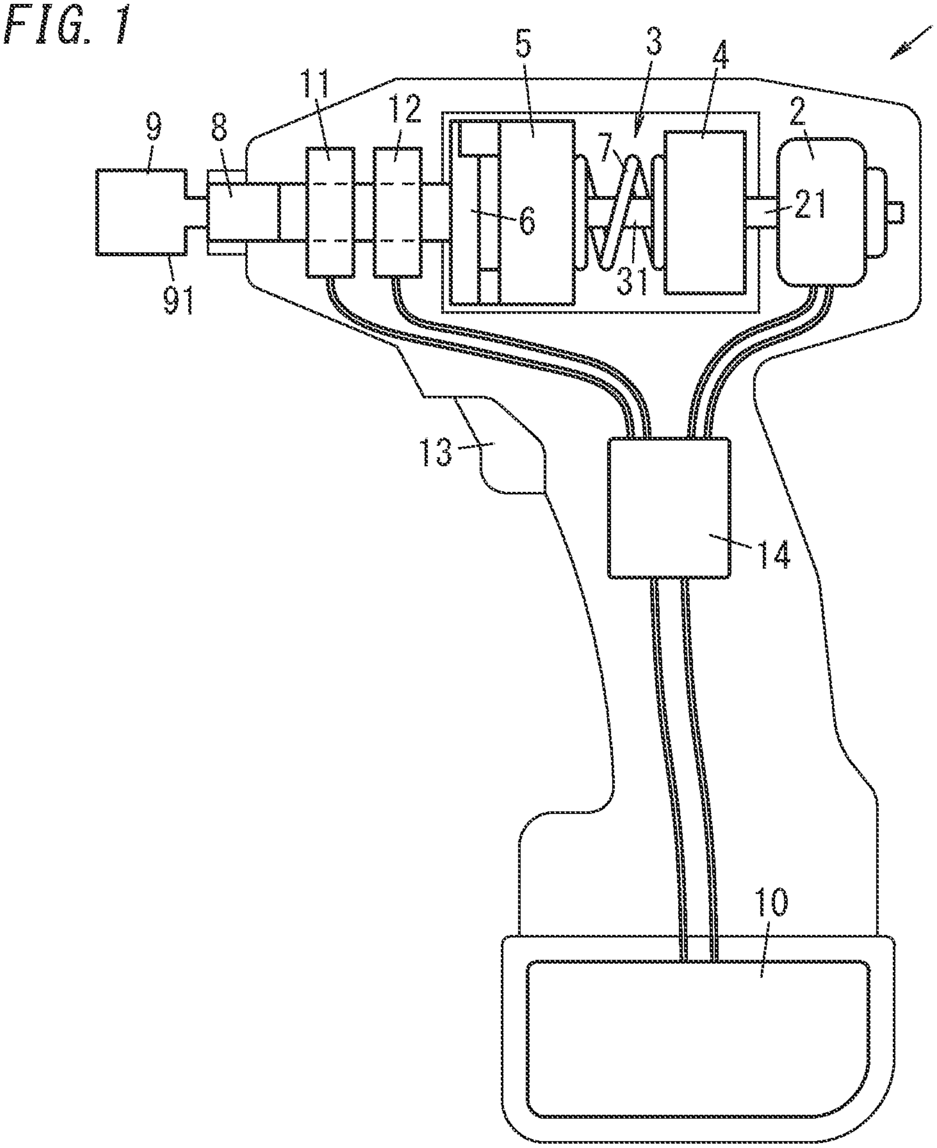
FIG. 1 is a schematic view of an impact rotary tool of an embodiment.
Figure 2:
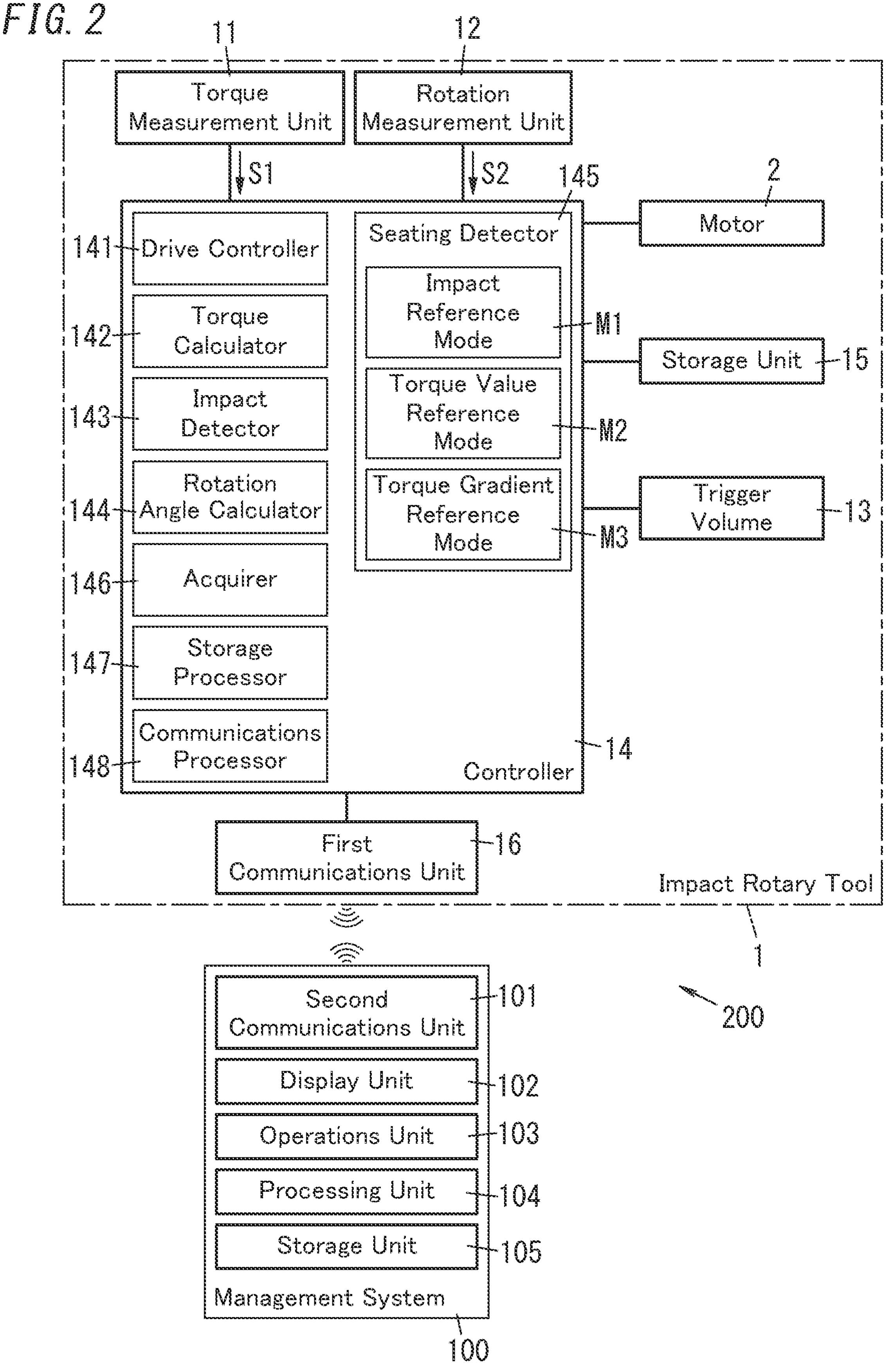
FIG. 2 is a block diagram of an impact rotary tool system including the impact rotary tool.

As shown in FIGS. 1 and 2, an impact rotary tool 1 of the present embodiment includes a motor 2, an output shaft 8, an impact mechanism 3, a seating detector 145, and an acquirer 146.

The output shaft 8 is configured to hold a tip tool 9. The tip tool 9 may be a socket bit 91, a driver bit, or the like. The output shaft 8 is configured to rotate by a motive power of the motor 2.

The impact mechanism 3 is configured to perform an impact operation to repeatedly generate, from the motive power of the motor 2, impact force acting on the output shaft 8.

The seating detector 145 is configured to detect a seating of a fastener component (threaded fastener). The seating of the fastener component is a state where the fastener component rotated by the tip tool 9 is just seated on a work target (fastened member). Examples of the fastener component include a screw, a bolt, and a nut. The work target may be a work (processed target). Examples of the work target includes a wood member, a resin member, and a metal member. As used herein, if the fastener component is a screw or a bolt, "seating/seated" means a condition or situation where a head of the fastener component reaches a work target while the fastener component is screwed in the work target. If the fastener component is a nut, "seating/seated" means a condition or situation where the fastener component (nut) reaches a work target while the fastener component is screwed to a bolt inserted in the work target.

The seating detector 145 has a plurality of seating detection modes.

The acquirer 146 is configured to acquire information indicative of one seating detection mode selected from the plurality of seating detection modes.

The seating detector 145 is configured to detect the seating of the fastener component based on the seating detection mode indicated by the information acquired by the acquirer 146.

As such, in the impact rotary tool 1 of the present embodiment, the seating detector 145 has the plurality of seating detection modes, and detects the seating of the fastener component based on one seating detection mode indicated by the information acquired by the acquirer 146, out of the plurality of seating detection modes. This allows a user of the impact rotary tool 1 to configure the setting for the impact rotary tool 1 such that the impact rotary tool 1 determines the fastener component is seated at a timing he/she intends to. Accordingly, the impact rotary tool 1 of the present disclosure that detects the seating at a timing approximated to a timing intended by a user. This contributes to increase the user-friendliness of the impact rotary tool 1. As used herein, the "user" may be a worker who performs a tightening work with the impact rotary tool 1, or may be a manager who operates a management system 100 to manage a machining work performed with the impact rotary tool 1.

(2) Details

It will be described below the impact rotary tool 1 and an impact rotary tool system 200 including the impact rotary tool 1 of the present embodiment with reference to the drawings.

As shown in FIG. 2, the impact rotary tool system 200 includes the impact rotary tool 1 and the management system 100.

(2.1) Impact Rotary Tool

As shown in FIGS. 1, 2, the impact rotary tool 1 includes the motor 2, the impact mechanism 3, the output shaft 8, a torque measurement unit 11, a rotation measurement unit 12, a trigger volume 13, a controller 14, a storage unit 15, and a communications unit (hereinafter, referred to as "first communications unit") 16.

As shown in FIG. 1, a rechargeable battery pack 10 is detachably mounted to the impact rotary tool 1. The impact rotary tool 1 operates with the electric power supplied from the battery pack 10. The battery pack 10 is a power source that supplies an electric current for driving the motor 2. The battery pack 10 includes an assembled battery including a plurality of second batteries (such as lithium-ion cells) connected in series with each other, and a case in which the assembled battery is housed. The battery pack 10 is not a constituent element of the impact rotary tool 1 in the present embodiment. Alternatively, the impact rotary tool 1 may include the battery pack 10 as a constituent element thereof.

The motor 2 may be a brushless motor, for example. The motor 2 includes a rotary shaft 21. The motor 2 converts the electric power supplied from the battery pack 10 into a rotary motive power of the rotary shaft 21.

The trigger volume 13 is an operating member configured to receive an operation for controlling the rotation of the motor 2. The motor 2 may be selectively activated (turned ON or OFF) by the operation of pulling the trigger volume 13. In addition, the rotational velocity of the motor 2 is adjusted depending on the pulled amount how deep the trigger volume 13 is pulled. The greater the pulled amount is, the higher the rotational velocity of the motor 2.

The impact mechanism 3 is configured to perform an impact operation to repeatedly generate, from the motive power of the motor 2, impact force acting on the output shaft 8.

As shown in FIG. 1, the impact mechanism 3 includes a drive shaft 31, a speed reducer mechanism 4, a hammer 5, an anvil 6, and a spring 7. Hereinafter, for the convenience of the explanation, a direction directed from the hammer 5 to the anvil 6 will be referred to as a "forward direction".

The drive shaft 31 is disposed between the motor 2 and the output shaft 8.

The speed reducer mechanism 4 is configured to transmit the rotary motive power of the rotary shaft 21 of the motor 2 to the drive shaft 31 with a velocity reduced from the rotational velocity of the rotary shaft 21 at a predetermined reduction ratio.

The hammer 5 moves relative to the anvil 6 and applies the rotational impact (impact) to the anvil 6 while receiving the motive power from the motor 2. The hammer 5 moves along an axis of the drive shaft 31 (in forward and backward directions) with respect to the drive shaft 31 and rotates with respect to the drive shaft 31. As the hammer 5 moves along the axis of the drive shaft 31 either toward, or away from, the anvil 6, the hammer 5 rotates with respect to the drive shaft 31. The hammer 5 is also rotatable with respect to the spring 7.

The anvil 6 is formed integrally with the output shaft 8. The anvil 6 faces the hammer 5 along the axis of the drive shaft 31. While the impact mechanism 3 is not performing the impact operation, the drive shaft 31, the hammer 5, and the anvil 6 rotate together.

The spring 7 is interposed between the hammer 5 and the speed reducer mechanism 4. The spring 7 of the present embodiment may be a conical coil spring, for example. The spring 7 applies, to the hammer 5, biasing force along the axis of the drive shaft 31 toward the output shaft 8.

In the following description, the movement of the hammer 5 along the axis of the drive shaft 31 toward the anvil 6 will be referred to as "advancement of the hammer 5". Also, in the following description, the movement of the hammer 5 along the axis of the drive shaft 31 away from the anvil 6 will be referred to as "retreat of the hammer 5".

In the impact mechanism 3, when a load torque increases to a predetermined value or more, an impact operation is started. That is to say, as the load torque increases, the proportion of a force component having a direction that causes the hammer 5 to retreat increases with respect to the force generated between the hammer 5 and the anvil 6. When the load torque increases to the predetermined value or more, the hammer 5 retreats while compressing the spring 7. According to the retreat of the hammer 5, the hammer 5 rotates while climbing over a part of the anvil 6. Thereafter, the hammer 5 advances upon receiving recovery force from the spring 7. As such, every time the drive shaft 31 goes approximately half around, the hammer 5 applies the rotational impact to the anvil 6.

As can be seen, in this impact mechanism 3, the hammer 5 applies the impact to the anvil 6 repeatedly. The torque caused by these impacts allows the fastener component such as a screw, a bolt, or a nut to be fastened more tightly than in a situation where no impact occur between the hammer 5 and the anvil 6.

The output shaft 8 is configured to hold the tip tool 9. The socket bit 91 as an example of the tip tool 9 is attached to the output shaft 8. The output shaft 8 transmits, to the tip tool 9, the rotatory motive power of the motor 2 received through the drive shaft 31, thus causing the tip tool 9 to turn. Turning the tip tool 9 while putting the tip tool 9 on a fastener component enables the user to perform the machining work of tightening the fastener component with respect to the work target. The output shaft 8 transmits, to the tip tool 9, the rotational impact force (impact force) received from the impact mechanism 3.

Note that the tip tool 9 may be attachable to, and removable from, the output shaft 8. Alternatively, the tip tool 9 may be non-detachably fixed to the output shaft 8. In the present embodiment, the tip tool 9 such as the socket bit 91 is not a constituent element of the impact rotary tool 1. Alternatively, the impact rotary tool 1 may include the tip tool 9 as a constituent element thereof.

The torque measurement unit 11 is configured to measure the tightening torque given by the output shaft 8. As used herein, the "tightening torque" means a torque applied to a fastener component (e.g., nut) or a head of a fastener component (e.g., screw or bolt) given in the tightening work. In the present embodiment, the torque measurement unit 11 may include a magnetostrictive strain sensor configured to detect the torsion strain, for example. The torque measurement unit 11 detects, using a coil disposed in a non-rotating portion, a variation in permeability corresponding to the strain caused upon the application of a torque to the output shaft 8. That is, the torque measurement unit 11 measures the torque applied to the output shaft 8 based on the strain of the output shaft 8, thereby indirectly measuring the tightening torque. The torque measurement unit 11 outputs, to the controller 14, a voltage signal proportional to the strain of the output shaft 8. Hereinafter, the signal output from the torque measurement unit 11 to the controller 14 will be referred to as a "first signal S1".

The rotation measurement unit 12 is configured to measure the rotation degree (angle of rotation) of the output shaft 8. The rotation measurement unit 12 may include a rotary encoder, for example. The rotation measurement unit 12 outputs, to the controller 14, a digital signal indicative of a measured angle of rotation of the output shaft 8. Hereinafter, the signal output from the rotation measurement unit 12 to the controller 14 will be referred to as a "second signal S2".

The storage unit 15 may include a semiconductor memory, for example. The storage unit 15 stores therein various information. The storage unit 15 stores information required for the operation of the controller 14. The storage unit 15 stores the information received through the first communications unit 16. The storage unit 15 stores the information generated by the controller 14.

The first communications unit 16 includes a communications interface configured to perform a wireless communication in conformity with the Wi-fi, Bluetooth, ZigBee, or specified low power radio standard. The first communications unit 16 performs the wireless communication with the management system 100 in the embodiment. Alternatively, the first communications unit 16 may be wire-connected with the management system 100 to perform the wire communications with the management system 100.

The controller 14 includes, for example, a computer system including one or more processors and one or more memories. That is to say, at least one function of the controller 14 is performed by making the one or more processors execute one or more programs stored in the one or more memories. The one or more programs may be stored in advance in the memory. Alternatively, the one or more programs may also be downloaded via a telecommunications line such as the Internet or distributed after having been stored in a non-transitory storage medium such as a memory card.

As shown in FIG. 2, the controller 14 includes a drive controller 141, a torque calculator 142, an impact detector 143, a rotation angle calculator 144, the seating detector 145, the acquirer 146, a storage processor 147, and a communications processor 148. The drive controller 141, the torque calculator 142, the impact detector 143, the rotation angle calculator 144, the seating detector 145, the acquirer 146, the storage processor 147, and the communications processor 148 do not necessarily have substantive configurations but represent functions to be performed by the controller 14.

The drive controller 141 is configured to control the operation of the motor 2. The drive controller 141 controls the on and off of the motor 2 in accordance with the operation performed on the trigger volume 13. The drive controller 141 is configured to control the voltage applied to the motor 2 to control the rotational velocity of the motor 2, in accordance with the pulled amount of the trigger volume 13.

The torque calculator 142 is configured to calculate a torque value (hereinafter, referred to as a "tightening torque value") based on the measurement result of the torque measurement unit 11. The tightening torque value indicates a value of the torque applied to the fastener component by the tightening work. The tightening torque value is estimated from the strain of the output shaft 8. Specifically, the torque calculator 142 receives the first signal S1 output from the torque measurement unit 11, and calculates the tightening torque value based on the strain of the output shaft 8 indicated by the first signal S1. The tightening torque value indicates the tightening torque applied to the output shaft 8 from the impact mechanism 3 per one impact, when the impact mechanism 3 performs the impact operation.

Figure 3:
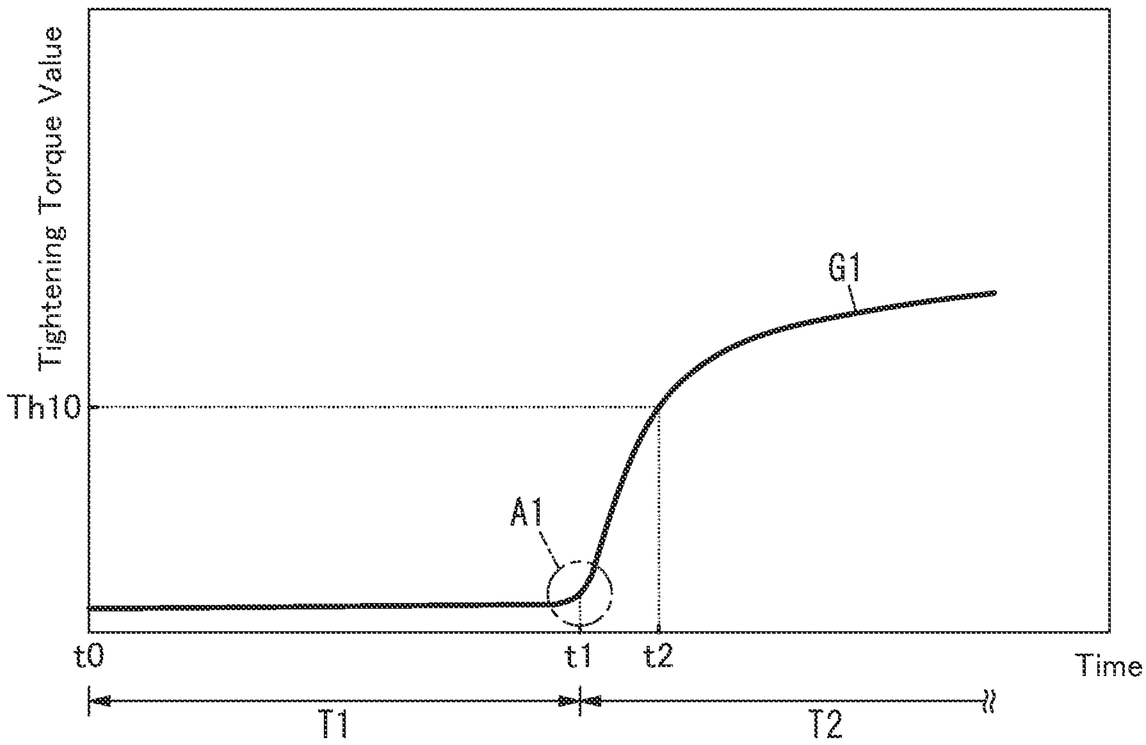
FIG. 3 illustrates waveform obtained by connecting peaks of a tightening torque value given by the impact rotary tool.
Figure 4:
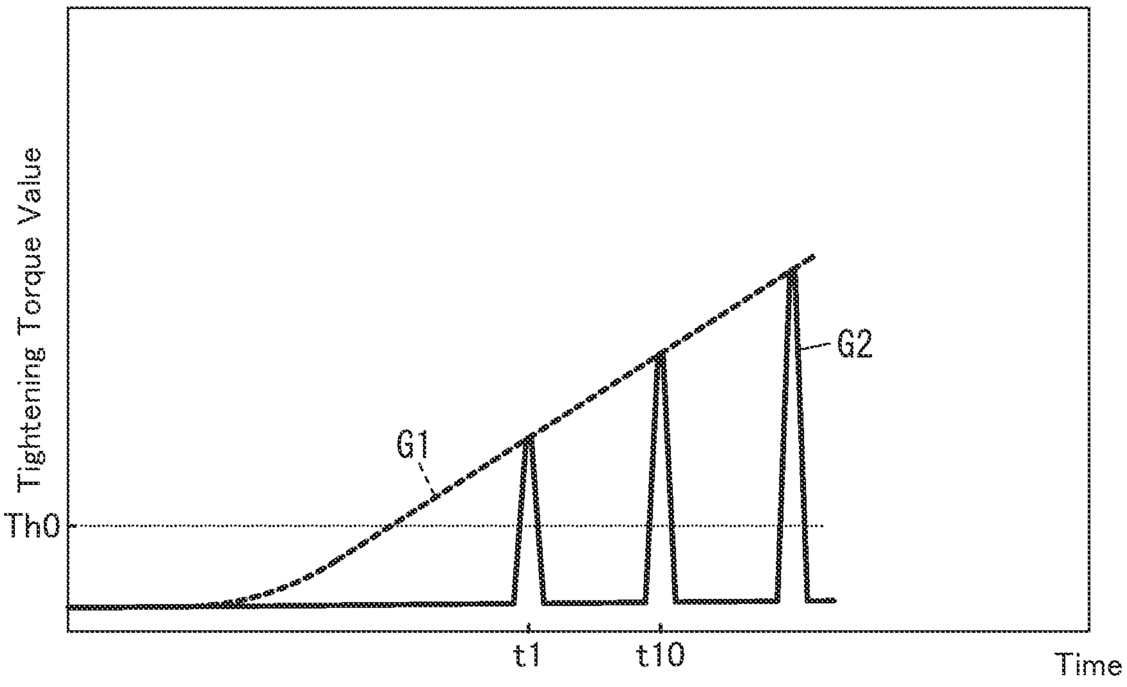
FIG. 4 illustrates waveform of the tightening torque value given by the impact rotary tool at around a region A1 shown in FIG. 3.

FIG. 3 illustrates a graph G1 schematically representing the time variation of the peak of the tightening torque value calculated by the torque calculator 142 under the situation where the tightening work is performed to tighten the fastener component with respect to the work target using the impact rotary tool 1. FIG. 4 illustrates a graph G2 schematically representing the time variation of the tightening torque value at around the region A1 shown in FIG. 3. In the example of FIGS. 3 and 4, the motor 2 is activated at the time point t0, and the impact mechanism 3 starts the impact operation at the time point t1.

As shown in FIG. 3, in a period T1 before the time point t1 at which the impact mechanism 3 starts the impact operation, the tightening torque value is substantially constant (at a value approximately 0) corresponding to a load torque required to rotate the fastener component. In a period T2 after the time point t1 at which the impact mechanism 3 starts the impact operation, the peak of the tightening torque value increases gradually in accordance with the advance of the tightening work of the fastener component (see the peaks of the protrusions of the waveform shown in FIG. 4).

The impact detector 143 is configured to detect the impact applied to the output shaft 8 from the impact mechanism 3. In the present embodiment, the impact detector 143 detects the occurrence of the impact based on the measurement result of the torque measurement unit 11. Specifically, the impact detector 143 compares the tightening torque value calculated by the torque calculator 142 with a predetermined threshold (impact threshold Th0; see FIG. 4). When detecting that the tightening torque value becomes equal to or greater than the impact threshold Th0 (i.e., detecting that the tightening torque value crosses the impact threshold Th0), the impact detector 143 determines that the impact has occurred. In an alternative example, the impact detector 143 may be configured to compare a variation (differential value) of the tightening torque value to the time with a threshold. In this case, the impact detector 143 may be configured to determine that the impact has occurred when detecting that the variation becomes equal to or greater the threshold.

The rotation angle calculator 144 is configured to calculate an angle of rotation of the output shaft 8. The rotation angle calculator 144 calculates the angle of rotation of the output shaft 8 based on the measurement result of the rotation measurement unit 12. The rotation angle calculator 144 receives the second signal S2 output from the rotation measurement unit 12, and calculates the angle of rotation of the output shaft 8 based on the received second signal S2.

Figure 5:
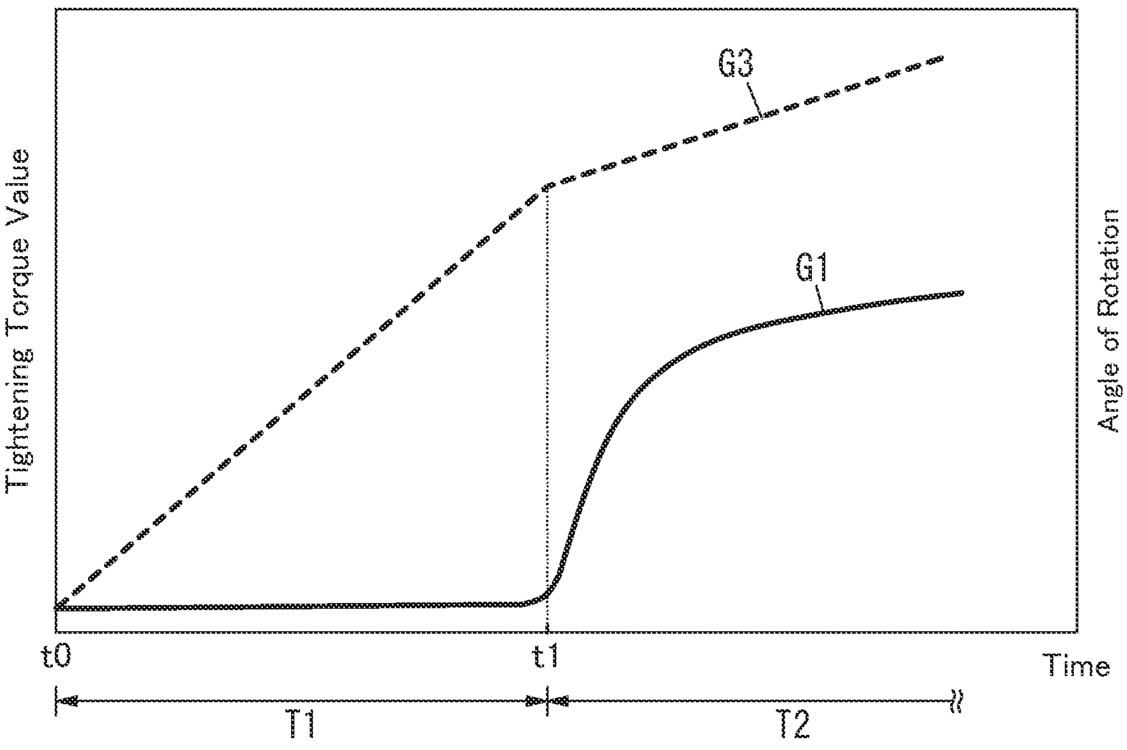
FIG. 5 illustrates waveform obtained by connecting peaks of a tightening torque value given by the impact rotary tool and waveform of an angle of rotation of an output shaft of the impact rotary tool.

FIG. 5 illustrates, together with the graph G1, a graph G3 schematically representing the time variation of the angle of rotation of the output shaft 8 calculated by the rotation angle calculator 144 under the situation where the tightening work is performed to tighten the fastener component with respect to the work target using the impact rotary tool 1. In the example of FIG. 5, the motor 2 is activated at the time point t0, and the impact mechanism 3 starts the impact operation at the time point t1.

In a period T1 before the time point t1 at which the impact mechanism 3 starts the impact operation, the output shaft 8 rotates together with the anvil 6, the hammer 5, and the drive shaft 31. In this period T1, the angle of rotation of the output shaft 8 increases with a constant gradient, as shown in FIG. 5.

In a period T2 after the time point t1 at which the impact mechanism 3 starts the impact operation, the output shaft 8 (anvil 6) rotates at a substantially fixed angle with respect to each impact applied from the hammer 5 to the anvil 6 that occurs every time the drive shaft 31 goes approximately half around. In this period T2, the angle of rotation of the output shaft 8 increases with a constant gradient, which is smaller than the gradient in the period T1 before the time point t1, as shown in FIG. 5

The seating detector 145 is configured to detect the seating of the fastener component. The seating of the fastener component is a state where the fastener component rotated by the tip tool 9 is just seated on a work target.

The seating detector 145 has a plurality of seating detection modes. In the present embodiment, the plurality of seating detection modes includes an impact reference mode M1, a torque value reference mode M2, and a torque gradient reference mode M3.

The impact reference mode M1 is a mode for detecting the seating based on a start time of the impact operation of the impact mechanism 3. The seating detector 145 operating in the impact reference mode M1 detects the seating based on the detection result of the impact detector 143. The seating detector 145 operating in the impact reference mode M1 determines that a time at which the impact mechanism 3 starts the impact operation is a time at which the fastener component is just seated (hereinafter, referred to as "seated time"), for example. According to the example of FIGS. 3 and 4, the seating detector 145 operating in the impact reference mode M1 determines the time point t1 as the seated time. In an alternative example, the seating detector 145 operating in the impact reference mode M1 may determine, as the seated time, another time point which is different from the time point t1 when the impact mechanism 3 starts the impact operation but is uniquely specified based on the time point t1. For example, the seating detector 145 operating in the impact reference mode M1 may determine, as the seated time, a time point at which the second impact is detected (time point t10 shown in FIG. 4), or a time point delayed or advanced by a predetermined time from the time point t1.

The torque value reference mode M2 is a mode for detecting the seating based on the tightening torque value. The seating detector 145 operating in the torque value reference mode M2 detects the seating based on the detection result of the torque measurement unit 11. The seating detector 145 operating in the torque value reference mode M2 detects the seating based on the tightening torque value calculated by the torque calculator 42. The seating detector 145 operating in the torque value reference mode M2 detects the seating based on a comparison result of the tightening torque value and a threshold. The seating detector 145 operating in the torque value reference mode M2 may determine that a time point at which the tightening torque value calculated by the torque calculator 142 becomes equal to or greater than the predetermined threshold (torque threshold Th10) is the seated time, for example. According to the example of FIG. 3, the seating detector 145 operating in the torque value reference mode M2 determines the time point t2 at which the tightening torque value becomes equal to or greater than the torque threshold Th10, as the seated time.

The torque gradient reference mode M3 is a mode for detecting the seating based on a relationship between the tightening torque value and the angle of rotation of the output shaft 8. The seating detector 145 operating in the torque gradient reference mode M3 detects the seating based on the detection result of the torque measurement unit 11 and the detection result of the rotation measurement unit 12. The seating detector 145 operating in the torque gradient reference mode M3 detects the seating based on the tightening torque value calculated by the torque calculator 142 and the angle of rotation calculated by the rotation angle calculator 144. The seating detector 145 operating in the torque gradient reference mode M3 may detect the seating based on a variation of the tightening torque value with respect to the angle of rotation (hereinafter, referred to as "torque gradient"), for example.

Figure 6:
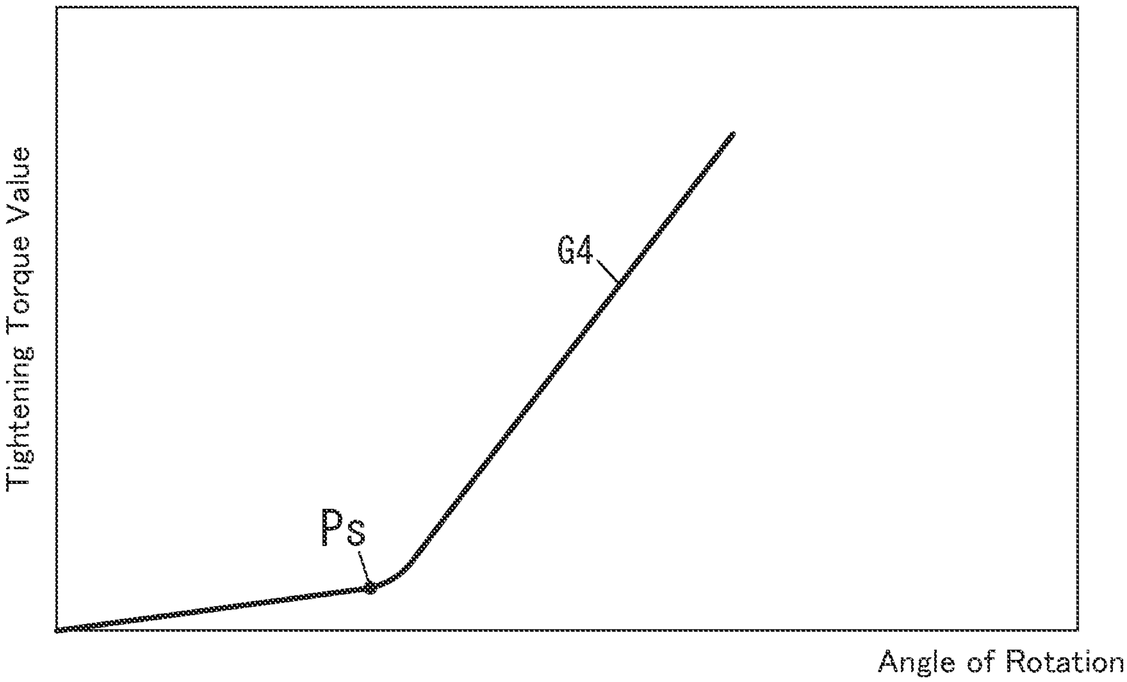
FIG. 6 is a graph illustrating a relationship between the angle of rotation of the output shaft and the tightening torque value of the impact rotary tool.
Figure 7:
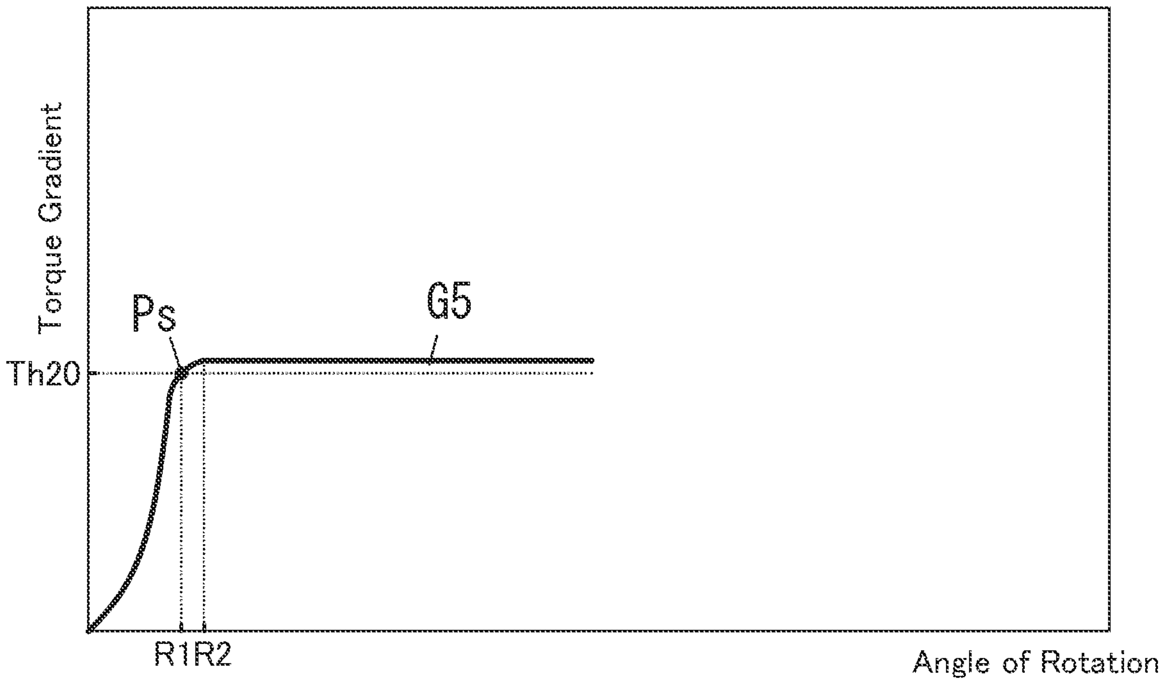
FIG. 7 is a graph illustrating a relationship between the angle of rotation of the output shaft and a torque gradient of the impact rotary tool.

FIG. 6 illustrates a graph G4 schematically representing the tightening torque value with respect to the angle of rotation of the output shaft 8. FIG. 7 illustrates a graph G5 schematically representing the torque gradient with respect to the angle of rotation of the output shaft 8. The point "Ps" shown in FIGS. 6 and 7 is so-called a snug point (at which a snug torque is applied; where the snug torque means a torque that ensures the bearing surfaces of the components are in full contact according to the angle control method).

The seating detector 145 operating in the torque gradient reference mode M3 may determine that a time point at which the torque gradient becomes equal to or greater than a predetermined threshold (torque gradient threshold Th20) is the seated time, for example. According to the example of FIG. 7, the seating detector 145 operating in the torque gradient reference mode M3 determines a time point corresponding to an angle of rotation R1 at which the torque gradient becomes equal to or greater than the torque gradient threshold Th20, as the seated time. In an alternative example, the seating detector 145 operating in the torque gradient reference mode M3 may determine, as the seated time, another time point corresponding to an angle of rotation R2 at which the differential value of the torque gradient with respect to the angle of rotation becomes substantially 0, for example.

The acquirer 146 is configured to acquire information (hereinafter, referred to as "instruction information") indicative of one seating detection mode selected from the plurality of (in the embodiment, three) seating detection modes. The instruction information is information that specifies a selected one of the plurality of seating detection modes, in the embodiment.

In the present embodiment, the instruction information is transmitted from the management system 100. Specifically, a user (manager) of the management system 100 performs an operation on the management system 100 to select one seating detection mode from the plurality of seating detection modes and make the management system 100 transmit the instruction information indicative of the selected seating detection mode to the impact rotary tool 1. Accordingly, the acquirer 146 acquires the instruction information.

The seating detector 145 is configured to detect the seating of the fastener component based on the one seating detection mode indicated by the instruction information acquired by the acquirer 146. When the impact reference mode M1 is indicated by the instruction information, the seating detector 145 starts to operate to detect the seating based on the detection result of the impact detector 143, for example.

The drive controller 141 may have a function to stop running the motor 2 based on the seated time detected by the seating detector 145, regardless of the operation performed on the trigger volume 13. For example, the drive controller 141 may be configured to, when the seating detector 145 detects the seating and then detects that the impact occurs a predetermined number of times after the detection of the seating, stop running the motor 2 regardless of the operation performed on the trigger volume 13 (i.e., even if the trigger volume 13 is pulled). In an alternative example, the drive controller 141 may be configured to, when the seating detector 145 detects the seating and then detects that the total angle of rotation calculated by the rotation angle calculator 144 after the detection of the seating reaches a predetermined angle, stop running the motor 2 regardless of the operation performed on the trigger volume 13.

The storage processor 147 is configured to make the storage unit 15 store therein various information.

The storage processor 147 stores, in the storage unit 15, information (hereinafter, referred to as "start time information") indicative of a start time when a tightening operation of the fastener component with respect to the work target starts. In an example, the start time information is information representing a clock time. In an example, the storage processor 147 may store, in the storage unit 15, a time point at which the motor 2 is activated in response to the pulled operation onto the trigger volume 13, as the start time when the tightening operation of the fastener component with respect to the work target starts. In an alternative example, the storage processor 147 may store, in the storage unit 15, a time point at which the pulling operation onto the trigger volume 13 is stated, as the start time when the tightening operation of the fastener component with respect to the work target starts The storage processor 147 stores, in the storage unit 15, information (hereinafter, referred to as "seated time information") indicative of the seated time. In an example, the seated time information is information representing a clock time. In an example, the storage processor 147 may store, in the storage unit 15, the seated time detected by the seating detector 145.

The storage processor 147 stores, in the storage unit 15, information (hereinafter, referred to as "end time information") indicative of an end time when the tightening operation of the fastener component with respect to the work target finishes. In an example, the end time information is information representing a clock time. In an example, the storage processor 147 may store, in the storage unit 15, a time point at which the motor 2 stops running in response to the release of the trigger volume 13, as the end time when the tightening operation of the fastener component with respect to the work target finishes. In an alternative example, the storage processor 147 may store, in the storage unit 15, a time point at which the drive controller 141 makes the motor 2 stop running based on the seated time detected by the seating detector 145, as the end time when the tightening operation of the fastener component with respect to the work target finishes.

That is to say, the storage processor 147 stores, in the storage unit 15, information for use to determine a period from a time of a start of a tightening operation of the fastener component with respect to the work target to a time when the fastener component is just seated. Moreover, the storage processor 147 stores, in the storage unit 15, information for use to determine a period from a time when the fastener component is just seated to an end time of a tightening operation of the fastener component with respect to the work target.

The communications processor 148 is configured to control the first communications unit 16 to transmit and receive various information to and from the management system 100.

In response to an appropriate request from the management system 100, the communications processor 148 transmits various information stored in the storage unit 15 to the management system 100. For example, the communications processor 148 transmits the start time information, the seated time information, the end time information and the like, to the management system 100 through the first communications unit 16.

The communications processor 148 receives various information from the management system 100 through the first communications unit 16. For example, the communications processor 148 receives the instruction information transmitted from the management system 100 through the first communications unit 16.

(2.2) Management System

The management system 100 is configured to manage the impact rotary tool 1. The management system 100 manages the machining work performed with the impact rotary tool 1.

The management system 100 may include a server, for example. Additionally or alternatively, the management system 100 may include an information terminal such as a personal computer, a smartphone, and a tablet terminal.

As shown in FIG. 2, the management system 100 includes a communications unit (hereinafter, referred to as a "second communications unit") 101, a display unit 102, an operations unit 103, a processing unit 104, and a storage unit 105.

The second communications unit 101 is configured to communicate with the first communications unit 16 of the impact rotary tool 1. The second communications unit 101 includes a communications interface configured to perform a wireless communication in conformity with the Wi-fi, Bluetooth, ZigBee, or specified low power radio standard. The second communications unit 101 performs the wireless communication with the first communications unit 16 of the impact rotary tool 1 in the embodiment. Alternatively, the second communications unit 101 may be wire-connected with the first communications unit 16 of the impact rotary tool 1 to perform the wire communications with the first communications unit 16.

The display unit 102 may include a liquid crystal display, an organic EL display, or the like, for example. The display unit 102 of the present embodiment displays thereon various information. The display unit 102 may display a screen prompting the user to enter the instruction information, for example. The display unit 102 may display the start time information, the seated time information, or the end time information received from the impact rotary tool 1, for example.

The operations unit 103 is configured to receive an operation performed thereon by the user. The operations unit 103 may include an appropriate mechanical switch, pointing device, button, and the like, for example. The operations unit 103 may include an operation button displayed on a screen of the display unit 102.

The display unit 102 and the operations unit 103 may be constituted together by a touchscreen panel display.

The processing unit 104 includes, for example, a computer system including one or more processors and one or more memories. That is to say, at least one function of the processing unit 104 is performed by making the one or more processors execute one or more programs stored in the one or more memories. The one or more programs may be stored in advance in the memory. Alternatively, the one or more programs may also be downloaded via a telecommunications line such as the Internet or distributed after having been stored in a non-transitory storage medium such as a memory card. The processing unit 104 is configured to control operations of the second communications unit 101, the display unit 102, and the operations unit 103.

The storage unit 105 may include a semiconductor memory, for example. The storage unit 105 stores therein various information.

The management system 100 may be used for managing the machining work performed with the impact rotary tool 1. The management system 100 transmits, to the impact rotary tool 1, the instruction information. The management system 100 receives, from the impact rotary tool 1, the start time information, the seated time information, and the end time information. The management system 100 associates the start time information, the seated time information, and the end time information received from the impact rotary tool 1 with identification information of this impact rotary tool 1 and stores it in the storage unit 105.

The management system 100 may display, on the display unit 102, a list (of a tabular form) of the start time information, the seated time information, and the end time information. According to this configuration, the user of the management system 100 can notice a mistake such as a use of a wrong fastener component (e.g., use of a screw having an extra/shortage thread length) when he/she finds that a length of a period between the start time and the seated time is too long/short compared to a regular one. Moreover, the user of the management system 100 can notice a working failure such as a fastening failure, i.e., the tightening torque applied to the fastener component is insufficient when he/she finds that a length of a period between the seated time and the end time is too short compared to a regular one. The management system 100 may display the start time information, the seated time information, and the end time information in a form other than the tabular form, such as a graph form.

The management system 100 may have a function for judging, based on the start time information, the seated time information, and the end time information, a possibility of presence of a failure in the machining work performed with the impact rotary tool 1. Examples of the failure in the machining work performed with the impact rotary tool 1 include the use of the wrong fastener component and the fastening failure described above. When determining that there is the possibility of the presence of the failure in the machining work performed with the impact rotary tool 1, the management system 100 may inform it of the user with a display or sound/voice. The function for judging the possibility of the presence of the failure in the machining work performed with the impact rotary tool 1 may be provided for the controller 14 of the impact rotary tool 1. In this case, the impact rotary tool 1 may further include a notification unit configured to inform, of the user, the possibility of the presence of the failure in the machining work.

The management system 100 may be configured to manage a plurality of impact rotary tools 1. The management system 100 may individually manage the plurality of impact rotary tools 1 based on a plurality pieces of identification information allocated one-to-one to the plurality of impact rotary tools 1.

As described above, in the impact rotary tool 1 and the impact rotary tool system 200 of the present embodiment, the seating detector 145 has the plurality of seating detection modes and is configured to detect the seating based on the one seating detection mode indicated by the instruction information acquired by the acquirer 146. In the embodiment, the plurality of seating detection modes includes the impact reference mode M1, the torque value reference mode M2, and the torque gradient reference mode M3. The impact reference mode M1 has, for example, an advantage that the seating is detected at a timing approximated to the actual feeling of the worker, since the seating is determined with reference to the start time of the impact operation. However, the impact reference mode M1 may have a possibility of making a wrong determination of the seating if a foreign material is bit between the fastener component and the work target and the impact operation starts before the fastener component is actually seated. The torque value reference mode M2 has an advantage to reduce the possibility of the wrong determination of the seating caused when a foreign material is bit therebetween, by appropriately setting the torque threshold Th10. The torque gradient reference mode M3 has an advantage that the result of the detection of the seated time can be used as a tightening indicator for the angle control method or the torque gradient control method specified by JIS B1083:2008 standard. As such, the plurality of seating detection modes have individual advantages. According to the impact rotary tool system 200 of the present embodiment, since the impact rotary tool 1 includes the seating detector 145 and the acquirer 146, the user can select the best one from the plurality of seating detection modes in consideration with the advantages thereof. This can increase the user-friendliness of the impact rotary tool 1.

(3) Variation

The embodiment described above is only one of various embodiments of the present disclosure, and may be readily modified, changed, replaced, or combined with any other embodiments, depending on a design choice or any other factor, without departing from a true spirit and scope of the present disclosure. Next, variations of the embodiment described above will be enumerated one after another. In the following description, the embodiment described above will be hereinafter sometimes referred to as a "basic example". Note that the basic example and any of the variations to be described below may be combined as appropriate.

The controller 14 of the impact rotary tool 1, the processing unit 104 of the management system 100 or the like according to the present disclosure includes a computer system. In that case, the computer system may include, as principal hardware components, a processor and a memory. The functions of the controller 14, the processing unit 104 or the like according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a largescale integrated circuit.

Also, the plurality of constituent elements (or the functions) of the controller 14 of the impact rotary tool 1 are integrated together in a single housing. However, this is only an example and should not be construed as limiting. Alternatively, those constituent elements (or functions) of the controller 14 may be distributed in multiple different housings. Still alternatively, at least some functions of the controller 14 may be implemented as a cloud computing system as well. Conversely, the plurality of functions of the controller 14 may be integrated together in a single housing.

(3.1) First Variation

An impact rotary tool system 200 of the present variation will be described with reference to FIG. 8. The impact rotary tool system 200 of the present variation differs from the impact rotary tool system 200 of the basic example in that an impact rotary tool 1 includes no seating detector and no acquirer, but a management system 100 includes a seating detector 106 and an acquirer 107. Components included in the impact rotary tool system 200 of the present variation and similar to those of the impact rotary tool system 200 of the basic example are allocated to the same reference signs and explanations thereof may be omitted.

Figure 8:
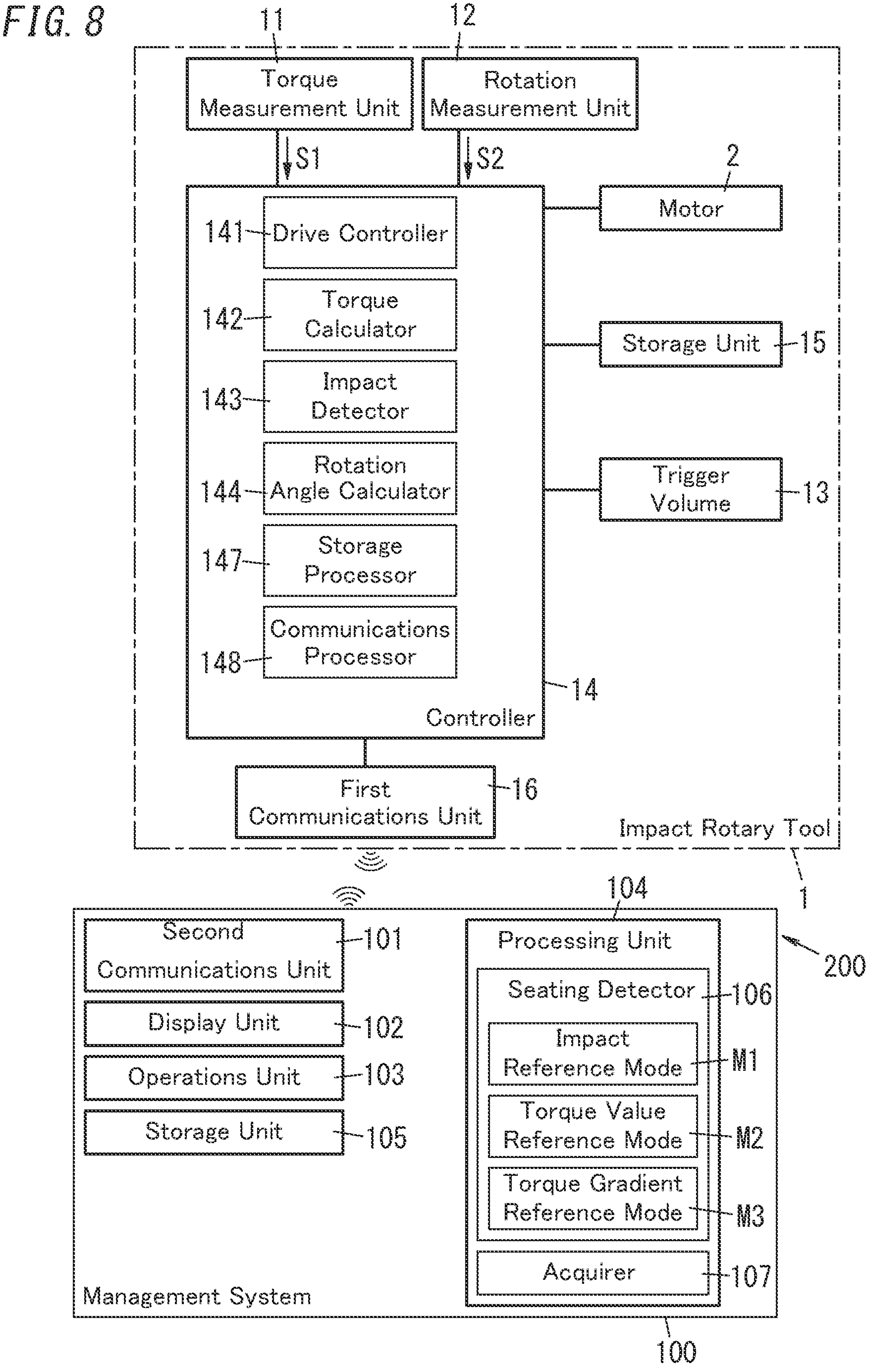
FIG. 8 is a block diagram of an impact rotary tool system including an impact rotary tool of a first variation.

As shown in FIG. 8, in the impact rotary tool 1 of the present variation, a controller 14 includes a drive controller 141, a torque calculator 142, an impact detector 143, a rotation angle calculator 144, a storage processor 147, and a communications processor 148.

The drive controller 141 is configured to control an operation of a motor 2. The torque calculator 142 is configured to calculate a tightening torque value based on the measurement result of a torque measurement unit 11. The impact detector 143 is configured to detect an impact applied to an output shaft 8 from an impact mechanism 3. The rotation angle calculator 144 is configured to calculate an angle of rotation of the output shaft 8 based on the measurement result of a rotation measurement unit 12.

The communications processor 148 is configured to transmit, to a management system 100, the tightening torque value calculated by the torque calculator 142, information about the impact detected by the impact detector 143, and the angle of rotation of the output shaft 8 calculated by the rotation angle calculator 144.

As shown in FIG. 8, the processing unit 104 of the management system 100 of the present variation includes the seating detector 106 and the acquirer 107.

The seating detector 106 has a plurality of seating detection modes. The plurality of seating detection modes includes an impact reference mode M1, a torque value reference mode M2, and a torque gradient reference mode M3.

The acquirer 107 is configured to acquire information (instruction information) indicative of one seating detection mode selected from the plurality of seating detection modes. The instruction information may be generated by the management system 100 in response to an appropriate operation performed on the operations unit 103, and provided to the acquirer 107, for example.

The seating detector 106 is configured to detect the seating of the fastener component based on the one seating detection mode indicated by the instruction information acquired by the acquirer 107.

Accordingly, the impact rotary tool system 200 of the present variation can detect the seating at a timing approximated to a timing intended by a user (e.g., a manager who operates the management system 100 to manage the machining work performed with the impact rotary tool 1).

In an alternative example, the management system 100 may include the torque calculator 142, the impact detector 143, and the rotation angle calculator 144. In this configuration, the impact rotary tool 1 may transmit a first signal S1 and a second signal S2 to the management system 100.

(3.2) Other Variation

In one variation, a seating detector 145 may include a seating detection mode other than the impact reference mode M1, the torque value reference mode M2 or the torque gradient reference mode M3. For example, the plurality of seating detection modes which the seating detector 145 has may include another seating detection mode for detecting the seating based on a measurement result of a rotation measurement unit 12. That is to say, in a case where information about a type (length, pitch) of a fastener component (screw, bolt) to be used for the machining work is known or set in advance, the seating can be detected based on the angle of rotation of the output shaft 8 (e.g., total angle of rotation of the output shaft 8, or total number of times that the output shaft 8 has turned).

In one variation, a plurality of seating detection modes includes the torque value reference mode M2 and the torque gradient reference mode M3 but does not include the impact reference mode M1.

In one variation, a plurality of seating detection modes includes the impact reference mode M1 and the torque gradient reference mode M3 but does not include the torque value reference mode M2.

In one variation, a plurality of seating detection modes includes the impact reference mode M1 and the torque value reference mode M2 but does not the torque gradient reference mode M3. In this variation, an impact rotary tool 1 may not include a rotation measurement unit 12.

In one variation, a threshold for the impact reference mode M1 (i.e., impact threshold Th0) may be set (changed) by a user. The threshold (impact threshold Th0) may be set (changed) based on an instruction from a management system 100, for example.

In one variation, a threshold for the torque value reference mode M2 (i.e., torque threshold Th10) may be set (changed) by a user. The threshold (torque threshold Th10) may be set (changed) based on an instruction from a management system 100, for example.

In one variation, a threshold for the torque gradient reference mode M3 (i.e., torque gradient threshold Th20) may be set (changed) by a user. The threshold (torque gradient threshold Th20) may be set (changed) based on an instruction from a management system 100, for example.

In one variation, an impact detector 143 may be configured to detect an impact applied to an output shaft 8 from an impact mechanism 3, based on information other than the measurement result of the torque measurement unit 11. Examples of the information to be used for detecting the impact include a detection result of a shock sensor such as a piezoelectric shock sensor, and a variation in a physical value (e.g., current or velocity) relating to a motor 2.

In one variation, a torque measurement unit 11 is not limited to a magnetostrictive sensor, but may include another torque sensor such as an optical type or the like.

In one variation, a rotation measurement unit 12 is not limited to a sensor that measures a rotation degree (angle of rotation) of the output shaft 8, but may include a sensor that measures a rotation degree (angle of rotation) of a motor 2. Note that the rotation degree of the output shaft 8 can be indirectly measured based on the rotation degree of the motor 2 and a speed reduction ratio of a speed reducer mechanism 4.

In one variation, an impact rotary tool 1 may include an operations unit (such as a switch or a button) configured to be operated by a worker who performs a machining work and generate instruction information in accordance with the received operation.

In one variation, instruction information may include two or more seating detection modes. In this variation, the seating detector 145 may detect the seating based on the detection results of the two or more seating detection modes indicated by the instruction information (e.g., logical OR or logical AND thereof).

(4) Aspect

As can be seen from the embodiment and variations described above, the present disclosure discloses the following aspects.

An impact rotary tool (1) of a first aspect includes a motor (2), an output shaft (8), an impact mechanism (3), and a seating detector (145). The output shaft (8) is configured to hold a tip tool (9) and configured to rotate by a motive power of the motor (2). The impact mechanism (3) is configured to perform an impact operation to repeatedly generate, from the motive power of the motor (2), impact force acting on the output shaft (8). The seating detector (145) is configured to detect a seating of a fastener component. The seating of the fastener component is a state where the fastener component rotated by the tip tool (9) is just seated on a work target. The seating detector (145) has a plurality of seating detection modes. The impact rotary tool (1) further includes an acquirer (146) configured to acquire information indicative of one seating detection mode selected from the plurality of seating detection modes. The seating detector (145) is configured to detect the seating of the fastener component based on the one seating detection mode indicated by the information acquired by the acquirer (146).

This aspect has an advantage that a timing at which the seating is detected can be approximated to a timing intended by a user and thus contributes to increase the user-friendliness of the impact rotary tool (1).

In the impact rotary tool (1) of a second aspect, with reference to the first aspect, the plurality of seating detection modes includes an impact reference mode (M1) for detecting the seating based on a start time of the impact operation.

This aspect allows the user to select the impact reference mode (M1)

In the impact rotary tool (1) of a third aspect, with reference to the first or second aspect, the plurality of seating detection modes includes a torque value reference mode (M2) for detecting the seating based on a torque value representing a tightening torque given by the output shaft (8).

This aspect allows the user to select the torque value reference mode (M2)

In the impact rotary tool (1) of a fourth aspect, with reference to any one of the first to third aspects, the plurality of seating detection modes includes a torque gradient reference mode (M3) for detecting the seating based on a relationship between a torque value representing a tightening torque given by the output shaft (8) and an angle of rotation of the output shaft (8).

This aspect allows the user to select the torque gradient reference mode (M3).

In the impact rotary tool (1) of a fifth aspect, with reference to the first aspect, the plurality of seating detection modes includes an impact reference mode (M1) for detecting the seating based on a start time of the impact operation, and a torque value reference mode (M2) for detecting the seating based on a torque value representing a tightening torque given by the output shaft (8).

This aspect allows the user to select a desired seating detection mode from the impact reference mode (M1) and the torque value reference mode (M2) and contributes to increase the user-friendliness of the impact rotary tool (1). Furthermore, according to the impact reference mode (M1) and the torque value reference mode (M2), the seating of the fastener component can be detected from the measurement result of a torque measurement unit (11) without the need for referring the measurement result of a rotation measurement unit (12), which contributes to simply the structure of the impact rotary tool (1).

In the impact rotary tool (1) of a sixth aspect, with reference to the first aspect, the plurality of seating detection modes includes an impact reference mode (M1) for detecting the seating based on a start time of the impact operation, and a torque gradient reference mode (M3) for detecting the seating based on a relationship between a torque value representing a tightening torque given by the output shaft (8) and an angle of rotation of the output shaft (8).

This aspect allows the user to select a desired seating detection mode from the impact reference mode (M1) and the torque gradient reference mode (M3) and contributes to increase the user-friendliness of the impact rotary tool (1).

In the impact rotary tool (1) of a seventh aspect, with reference to the first aspect, the plurality of seating detection modes includes an impact reference mode (M1) for detecting the seating based on a start time of the impact operation, a torque value reference mode (M2) for detecting the seating based on a torque value representing a tightening torque given by the output shaft (8), and a torque gradient reference mode (M3) for detecting the seating based on a relationship between a torque value representing a tightening torque given by the output shaft (8) and an angle of rotation of the output shaft (8).

This aspect allows the user to select a desired seating detection mode from the impact reference mode (M1), the torque value reference mode (M2), and the torque gradient reference mode (M3) and contributes to increase the user-friendliness of the impact rotary tool (1).

The impact rotary tool (1) of an eighth aspect, with reference to any one of the first to seventh aspects, further includes a storage unit (15) configured to store information for use to determine a period from a start time of a tightening operation of the fastener component with respect to the work target to a time when the fastener component is just seated.

This aspect allows the user to check the failure occurred during the period from the start time of the tightening operation to the seated time.

The impact rotary tool (1) of a ninth aspect, with reference to any one of the first to eighth aspects, further includes a storage unit (15) configured to store information for use to determine a period from a time when the fastener component is just seated to an end time of a tightening operation of the fastener component with respect to the work target.

This aspect allows the user to check the failure occurred during the period from the seated time to the end time of the tightening operation.

A management system (100) of a tenth aspect is for managing an impact rotary tool (1). The impact rotary tool (1) includes a motor (2), an output shaft (8)m an impact mechanism (3), and a first communications unit (16). The output shaft (8) is configured to hold a tip tool (9) and configured to rotate by a motive power of the motor (2). The impact mechanism (3) is configured to perform an impact operation to repeatedly generate, from the motive power of the motor (2), impact force acting on the output shaft (8). The first communications unit (16) is configured to communicate with the management system (100). The management system (100) includes a second communications unit (101) and a seating detector (106). The second communications unit (101) is configured to communicate with the first communications unit (16) of the impact rotary tool (1). The seating detector (106) is configured to detect, based on information acquired from the impact rotary tool (1) through the second communications unit (101), a seating of a fastener component. The seating of the fastener component is a state where the fastener component rotated by the tip tool (9) held by the output shaft (8) of the impact rotary tool (1) is just seated on a work target. The seating detector (106) has a plurality of seating detection modes. The management system (100) further includes an acquirer (107) configured to acquire information indicative of one seating detection mode selected from the plurality of seating detection modes. The seating detector (106) is configured to detect the seating of the fastener component based on the one seating detection mode indicated by the information acquired by the acquirer (107).

This aspect has an advantage that a timing at which the seating is detected can be approximated to a timing intended by a user and thus contributes to increase the user-friendliness of the impact rotary tool (1).

An impact rotary tool system (200) of an eleventh aspect includes an impact rotary tool (1) and a management system (100). The impact rotary tool (1) includes a motor (2), an output shaft (8), an impact mechanism (3), and a first communications unit (16). The output shaft (8) is configured to hold a tip tool (9) and configured to rotate by a motive power of the motor (2). The impact mechanism (3) is configured to perform an impact operation to repeatedly generate, from the motive power of the motor (2), impact force acting on the output shaft (8). The first communications unit (16) is configured to communicate with the management system (100). The management system (100) includes a second communications unit (101) and a seating detector (106). The second communications unit (101) is configured to communicate with the first communications unit (16) of the impact rotary tool (1). The seating detector (106) is configured to detect, based on information acquired from the impact rotary tool (1) through the second communications unit (101), a seating of a fastener component. The seating of the fastener component is a state where the fastener component rotated by the tip tool (9) held by the output shaft (8) of the impact rotary tool (1) is just seated on a work target. The seating detector (106) has a plurality of seating detection modes. The management system (100) further includes an acquirer (107) configured to acquire information indicative of one seating detection mode selected from the plurality of seating detection modes. The seating detector (106) is configured to detect the seating of the fastener component based on the one seating detection mode indicated by the information acquired by the acquirer (107).

This aspect has an advantage that a timing at which the seating is detected can be approximated to a timing intended by a user and thus contributes to increase the user-friendliness of the impact rotary tool (1).

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An impact rotary tool system, comprising:

an impact rotary tool; and a management system for managing the impact rotary tool, wherein:

the impact rotary tool comprises:

a motor;

an output shaft configured to hold a tip tool and configured to rotate by a motive power of the motor;

an impact mechanism configured to perform an impact operation to repeatedly generate, from the motive power of the motor, impact force acting on the output shaft;

a seating detector configured to detect a seating of a fastener component which is a state where the fastener component rotated by the tip tool is just seated on a work target;

a storage unit configured to store information for use to determine a period from a start time of a tightening operation of the fastener component with respect to the work target to a time when the fastener component is just seated, and information for use to determine a period from the time when the fastener component is just seated to an end time of a tightening operation of the fastener component with respect to the work target; and a communications unit configured to communicate with the management system, the seating detector comprises a plurality of seating detection modes, the impact rotary tool further comprises an acquirer configured to acquire information indicative of one seating detection mode selected from the plurality of seating detection modes, the seating detector is configured to detect the seating of the fastener component based on the one seating detection mode indicated by the information acquired by the acquirer, the storage unit being configured to store start time information indicative of the start time when the tightening operation of the fastener component with respect to the work target starts, seated time information indicative of a seated time when the fastener component is just seated, and end time information indicative of the end time when the tightening operation of the fastener component with respect to the work target finishes, at least one of the impact rotary tool or the management system is configured to perform at least one of a first determination or a second determination, the first determination includes determining of use of a wrong fastener component when finding that a length of a period between the start time and the seated time is longer than a first threshold time or finding that the length of the period between the start time and the seated time is shorter than a second threshold time shorter than the first threshold time, and the second determination includes determining a fastening failure when finding that a length of a period between the seated time and the end time is shorter than a third threshold time.

2. The impact rotary tool of claim 1, wherein the plurality of seating detection modes includes an impact reference mode for detecting the seating based on a start time of the impact operation.

3. The impact rotary tool of claim 1, wherein the plurality of seating detection modes includes a torque value reference mode for detecting the seating based on a torque value representing a tightening torque given by the output shaft.

4. The impact rotary tool of claim 1, wherein the plurality of seating detection modes includes a torque gradient reference mode for detecting the seating based on a relationship between a torque value representing a tightening torque given by the output shaft and an angle of rotation of the output shaft.

5. The impact rotary tool of claim 1, wherein the plurality of seating detection modes includes an impact reference mode for detecting the seating based on a start time of the impact operation, and a torque value reference mode for detecting the seating based on a torque value representing a tightening torque given by the output shaft.

6. The impact rotary tool of claim 1, wherein the plurality of seating detection modes includes an impact reference mode for detecting the seating based on a start time of the impact operation, and a torque gradient reference mode for detecting the seating based on a relationship between a torque value representing a tightening torque given by the output shaft and an angle of rotation of the output shaft.

7. The impact rotary tool of claim 1, wherein the plurality of seating detection modes includes an impact reference mode for detecting the seating based on a start time of the impact operation, a torque value reference mode for detecting the seating based on a torque value representing a tightening torque given by the output shaft, and a torque gradient reference mode for detecting the seating based on a relationship between a torque value representing a tightening torque given by the output shaft and an angle of rotation of the output shaft.

8. An impact rotary system, comprising:

an impact rotary tool; and a management system for managing the impact rotary tool, wherein:

the impact rotary tool includes:

a motor;

an output shaft configured to hold a tip tool and configured to rotate by a motive power of the motor;

an impact mechanism configured to perform an impact operation to repeatedly generate, from the motive power of the motor, impact force acting on the output shaft; and a first communications unit configured to communicate with the management system, the management system comprises:

a second communications unit configured to communicate with the first communications unit of the impact rotary tool; and a seating detector configured to detect, based on the information acquired from the impact rotary tool through the second communications unit, a seating of a fastener component which is a state where the fastener component rotated by the tip tool held by the output shaft of the impact rotary tool is just seated on a work target, wherein:

the seating detector comprises a plurality of seating detection modes, the management system further comprises an acquirer configured to acquire information indicative of one seating detection mode selected from the plurality of seating detection modes, the seating detector is configured to detect the seating of the fastener component based on the one seating detection mode indicated by the information acquired by the acquirer, at least one of the impact rotary tool or the management system includes a storage unit configured to store information for use to determine a period from a start time of a tightening operation of the fastener component with respect to the work target to a time when the fastener component is just seated, and information for use to determine a period from the time when the fastener component is just seated to an end time of a tightening operation of the fastener component with respect to the work target, the storage unit is configured to store start time information indicative of the start time when the tightening operation of the fastener component with respect to the work target starts, seated time information indicative of a seated time when the fastener component is just seated, and end time information indicative of the end time when the tightening operation of the fastener component with respect to the work target finishes, at least one of the impact rotary tool or the management system is configured to perform at least one of a first determination or a second determination, the first determination includes determining of use of a wrong fastener component when finding that a length of a period between the start time and the seated time is longer than a first threshold time or finding that the length of the period between the start time and the seated time is shorter than a second threshold time shorter than the first threshold time, and the second determination includes determining a fastening failure when finding that a length of a period between the seated time and the end time is shorter than a third threshold time.

* * * * *